Sept. 30, 1952 O. M. STUETZER 2,612,567

TRANSCONDUCTOR EMPLOYING FIELD CONTROLLED SEMICONDUCTOR

Filed Oct. 4, 1949 4 Sheets-Sheet 1

INVENTOR.
OTMAR M. STUETZER
BY Wade Koontz
ATTORNEY and
James S. Shannon
AGENT—

Sept. 30, 1952 O. M. STUETZER 2,612,567

TRANSCONDUCTOR EMPLOYING FIELD CONTROLLED SEMICONDUCTOR

Filed Oct. 4, 1949 4 Sheets-Sheet 2

INVENTOR.
OTMAR M. STUETZER
BY Wade Koontz
ATTORNEY
James S. Shannon
AGENT

TRANSCONDUCTOR EMPLOYING FIELD CONTROLLED SEMICONDUCTOR

Filed Oct. 4, 1949 4 Sheets-Sheet 3

INVENTOR.
OTMAR M. STUETZER
BY Wade Koontz
ATTORNEY and
James S. Shannon
AGENT

INVENTOR.
OTMAR M. STUETZER
BY Wade Koontz
ATTORNEY and
James S. Shannon
AGENT-

Patented Sept. 30, 1952

2,612,567

UNITED STATES PATENT OFFICE 2,612,567

TRANSCONDUCTOR EMPLOYING FIELD CONTROLLED SEMICONDUCTOR

Otmar Michael Stuetzer, Dayton, Ohio

Application October 4, 1949, Serial No. 119,541

2 Claims. (Cl. 179—171)

(Granted under the act of March 3, 1883, as amended April 30, 1928; 370 O. G. 757)

The invention described herein may be manufactured and used by or for the Government for governmental purposes without payment to me of any royalty thereon.

This invention relates to transconductive devices and particularly to such devices employing semi-conductors as the current controlling element.

It is the object of the invention to provide a device which has the substantially unilateral transductance or mutual conductance, and the high input impedance of a three electrode vacuum tube but which does not require a thermionic emitter or an evacuated envelope.

A known type of transconductor employing a semiconductor is described in an article entitled "The Transistor—A crystal Triode" appearing in the September 1948 issue of "Electronics." The "transistor" described in this article employs a germanium crystal and two electrodes making point contact with the crystal at points very close together. A load impedance and a voltage acting in the back direction of the crystal are connected between the crystal and one of the electrodes called the collector electrode. A bias voltage acting in the forward direction of the crystal and a source of signal voltage are connected in series between the crystal and the other electrode called the emitter electrode. In this device the electrical contact between the emitter or input electrode and the crystal results in a very low input impedance which limits the power amplification to about 20 decibels. Also the considerable current in the low resistance input circuit due to the forward acting bias voltage results in a power wastage which lowers the efficiency of the device.

The transconductor in accordance with the invention utilizes a semiconductor crystal having an output electrode making a point contact therewith as in the case of the above described transistor. However the input electrode, instead of making contact with the crystal, is brought as close to the point of contact of the output electrode as is possible without contacting the crystal or the output electrode. The input electrode controls the electrical field in the semiconductor in the neighborhood of the point of contact of the output electrode. Variations in the input electrode potential, as by a signal voltage applied thereto, produce similar variations in current in the output electrode, or in other words, a transconductance exists between the input and output circuits of the device. Because of the fact that the input electrode is not in conductive relation with the crystal the input impedance of the device is extremely high as in the case of a vacuum tube. The signal power absorbed by the input circuit therefore approaches zero, so that the power amplification of the device is also extremely high. Further, the efficiency of the device is increased over that of the "transistor" since the high impedance between control electrode and crystal prevents current drain on the bias source and the power wastage caused thereby.

It is therefore a further object of the invention to provide a transconductor of the semiconductor type which has a higher input impedance, a higher power amplification and a higher efficiency than known devices of this type.

The physical effects underlying the current controlling action of an electrical field in the neighborhood of a point contact on a relatively thick semiconductor are not understood at the present time and therefore no theory of operation of the described field controlled transductive device will be offered. The effect of electrical fields on thin films of semiconductors has been investigated by W. Shockley and L. Pearson and their findings are reported in an article entitled "Modulation of Conductance of Thin Films of Semiconductors," appearing in "Physical Review," volume 74, July 1948. It is found, however, that the effect produced by an electrical field acting in the neighborhood of a point contact on a relatively thick semiconductor is from 1000 to 100,000 times greater than can be explained by the Shockley-Pearson theory. It appears likely, therefore, that the physical nature of the effect acting in the described transconductor is entirely different from that operating in the case of thin films of semiconductors as described by Shockley and Pearson.

The transconductive device described may be used, for example, as a power amplifier, oscillator, rectifier, frequency converter, phase or polarity inverter, impedance changer, and, in general, may be put to almost any use, within its power handling limits, to which a vacuum tube may be put. In its present stage of development, however, the device is not suitable as a voltage amplifier as the voltage gain in most cases will not exceed unity.

The invention will be described in more detail in connection with several preferred embodiments thereof as shown in the accompanying drawings, in which Fig. 1 shows the arrangement of electrodes and semiconductor in a transconductive device in accordance with the invention;

Fig. 1*a* shows a modification of Fig. 1 employing a dielectric between control electrodes and semiconductor;

Figure 1:
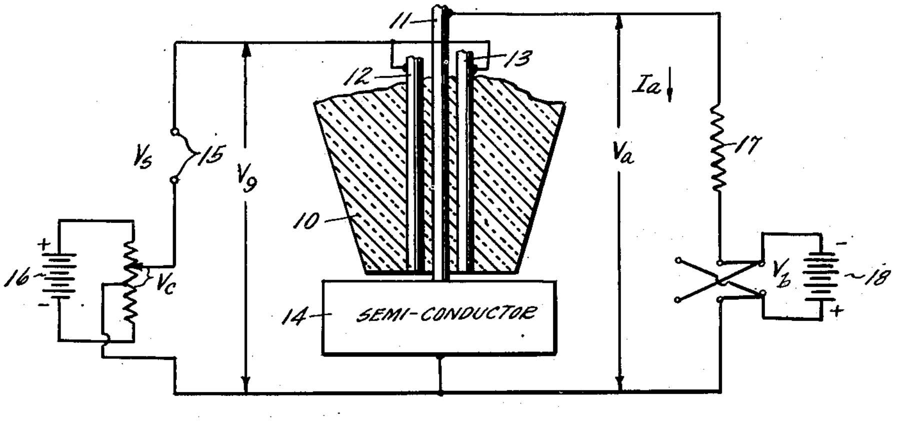

Referring to Fig. 1, a simplified drawing of a transconductor in accordance with the invention is shown. A spacer 10 made of glass or other suitable insulating material serves to support output electrode 11 and input or control electrodes 12 and 13 in very close physical relation. The output electrode 11 is brought into contact with the semiconductor 14, however, the input or control electrodes 12 and 13 do not touch the semiconductor but are brought as close thereto as possible without making electrical contact. The sizes of the electrodes and the spacings are quite small so that the control electrodes 12 and 13 may be positioned as close as possible to the point of contact of the output electrode 11. This enables the control electrodes to apply and control an electrical field in the immediate neighborhood of the point contact. To this end the electrodes 11, 12 and 13 may have diameters of from 2 to 50 microns and the distance from the center of electrode 11 to the outermost part of electrode 12 or 13 may be of the order of 200 microns. Suitable materials for the electrodes are fine wires of tungsten, molybdenum or platinum. The semiconductor 14 is preferably $n$-type or $p$-type germanium, $p$-type silicon or tellurium. The $n$ and $p$ designation is in accordance with the present theory of conduction within a semiconductor having a slight amount of another element contained therein as an impurity. In the $n$-type semiconductor there are extra electrons in the interatomic bonds between the atoms of the principal material of the semiconductor and the atoms of the impurity and conduction through this type consists in movement of the excess electrons. In the $p$-type semiconductor there is a lack of electrons or "holes" in the interatomic bonds and the presence of such "holes" makes electron movement or conduction within the semiconductor possible. Cuprous oxide and selenium are also suitable semiconductors for low frequencies but exhibit relaxation effects which make them undesirable for high frequency use.

Although only two input or control electrodes 12 and 13 are shown in Fig. 1 for the sake of simplicity, a practical embodiment of the device should preferably have a ring of five or six such electrodes uniformly spaced and extending completely around the output electrode 11. The input or control electrodes are connected together and the input circuit, containing terminals 15 for the application of a signal voltage and bias voltage source 16, extends from the parallel connected control electrodes to the semiconductor 14. The output circuit is connected between the output electrode 11 and semiconductor 14 and contains load impedance 17 and a source of direct current 18.

For maximum power output the voltage $V_b$ of source 18 should act in the back direction, or direction of greater resistance of the semiconductor. For $n$-type germanium the back direction is with the contacting electrode negative and the semiconductor positive. With the crystal operated in its back direction the output impedance of the device may be from 5000 to 100,000 ohms depending upon the semiconductor used, contact area, contact pressure, etc. The device also may be operated with the voltage acting in the forward direction of the semiconductor and such operation has the advantage of lower noise generation and smaller relaxation effects; however, for such operation, the voltage $V_g$ should be kept below the contact potential of the contacting electrode and the semiconductor or else proper care for matching the low output impedance that would result from higher forward acting voltages must be taken.

Figure 2:
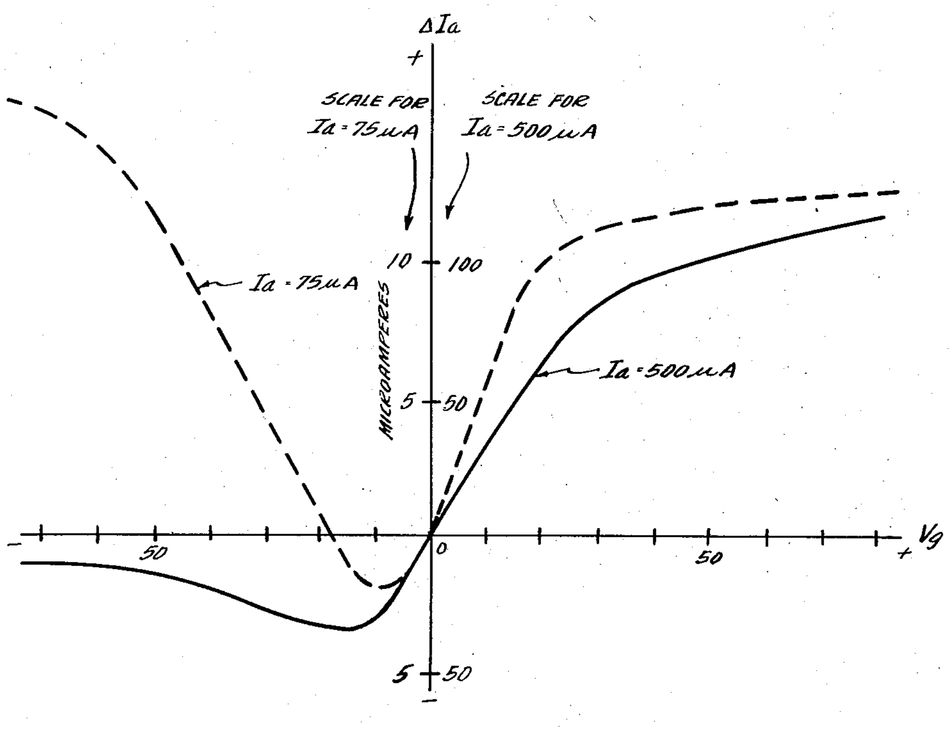
Figs. 2, 3 and 4 are characteristic curves of a transconductive device in accordance with the invention.
Figure 3:
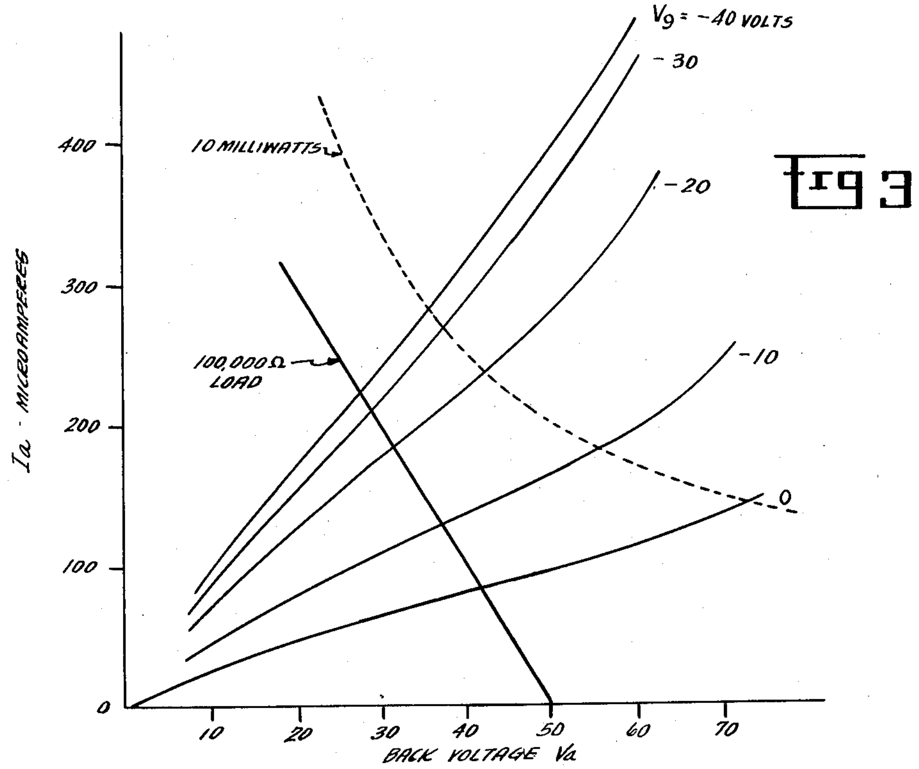
Figure 4:
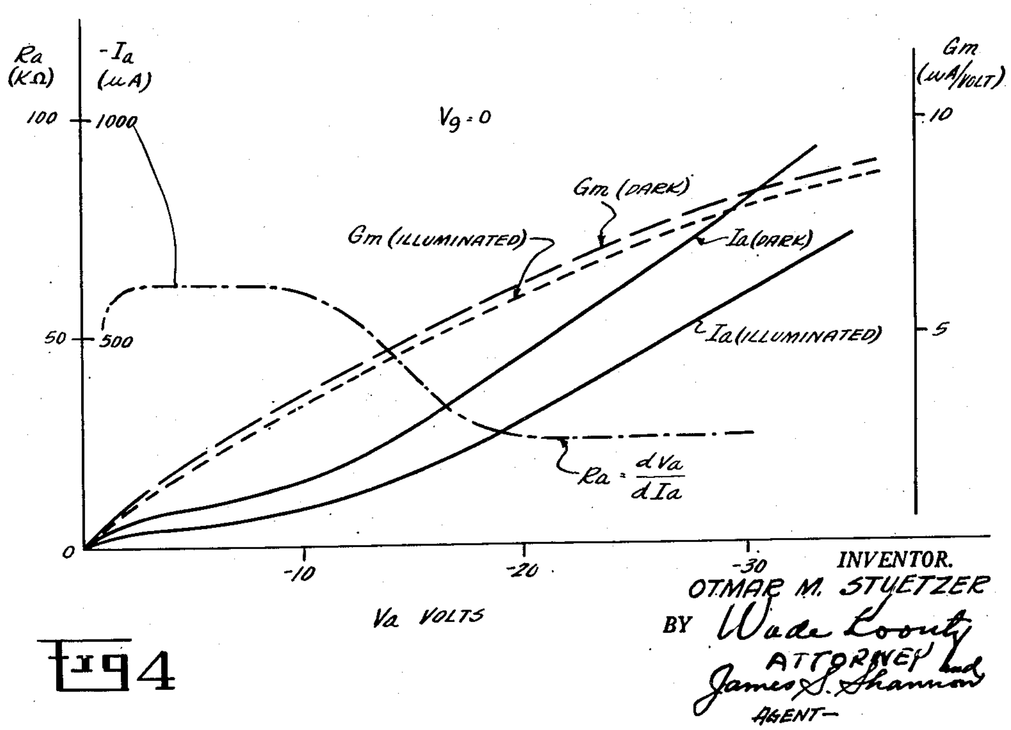

The characteristics of a typical transconductor made in accordance with the invention and with the semiconductor operated in the back direction are shown in Figs. 2, 3 and 4. Fig. 2 shows the relationship between control electrode voltage $V_g$, as shown in Fig. 1, and the change in output electrode current $I_a$ from its value when $V_g=0$. This relationship is given for two values of $I_a$, namely, 75 microamperes and 500 microamperes. The mutual conductance of $G_m$ of the device at any particular value of $V_g$ would be equal to the derivative of the curve at that point. It will be noted that the mutual conductance, i. e. the derivative of the curves, passes through zero and changes sign in the vicinity of $V_g=-10$ volts. The value of $V_g$ at which this change occurs corresponds very closely to the negative potential on the surface of the semiconductor due to the contact current, or, in other words, the potential difference and resulting field between the control electrode and the semiconductor is zero at this point.

Fig. 3 shows the static output electrode voltage-output electrode current characteristics with bias voltage $V_g$ as a parameter. The characteristics are for a device operated in the negative slope or negative mutual conductance region.

Fig. 4 gives curves of mutual conductance $G_m$, output electrode current $I_a$, and dynamic output electrode resistance $R_a$ plotted against back voltage $V_a$ for a value of $V_g=0$. This figure also shows the effect of illumination of the point contact on $G_m$ and $I_a$. It is seen that the dynamic output electrode resistance $R_a=dV_a/dI_a$ lies within the limits of approximately 25,000 ohms and 65,000 ohms. It is also seen that the mutual conductance $G_m$ is approximately proportional to output electrode current.

Figure 1A:
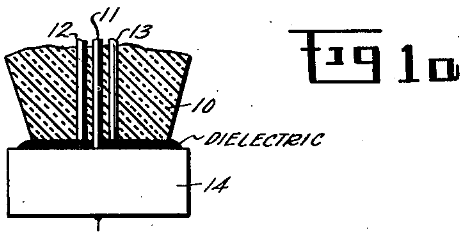

In apparatus constructed in accordance with Fig. 1 in which the control electrodes do not touch the semiconductor or the output electrode the input impedance is theoretically infinite. In practice of course the attainment of this ideal is impossible and under the best conditions input impedances of 1000 to 10,000 megohms will be measured. Furthermore, it has been found experimentally that the controlling effect of the input electrodes can be increased by filling the space between the electrodes and the semiconductor with a material of high dielectric constant such as titaniumdioxide or titaniumborate powder, bariumtitanate, triethylene glycol, glycerine, oil, amorphous carbon or distilled water as shown in Fig. 1*a*. These materials may be pressed with a comparatively high force between the control electrodes and the semiconductor. Another method of obtaining extremely close spacing with dielectric separation is to employ control electrodes of aluminum, first oxidized on the ends to form an insulating surface layer and then pressed against the semiconductor. The effect of all practical dielectrics so inserted is to reduce the input impedance to a value between 10 and 100 megohms thus reducing the current and power amplification. However, the mutual conductance is increased by a factor roughly equal to the dielectric constant of the insulating material used. Typical devices using a dielectric between the control electrodes and the semiconductor have exhibited voltage amplifications of approximately unity and current amplifications of 100 to 1000.

Figure 5:
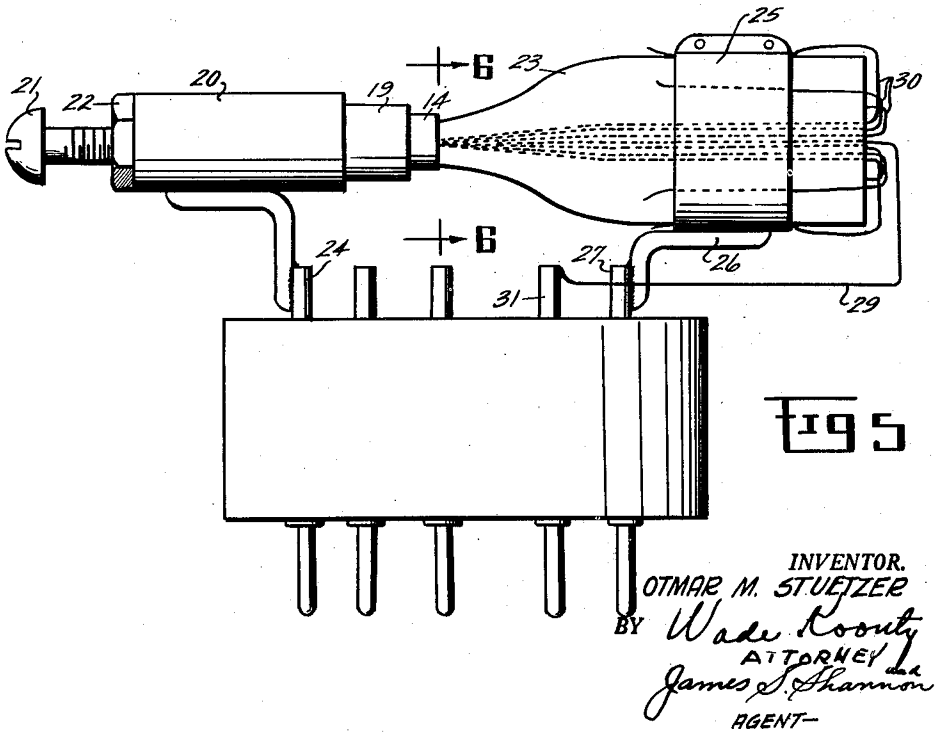
Fig. 5 shows the physical arrangement of elements in a practical embodiment of the invention.

A practical embodiment of a transconductive device in accordance with the invention is shown in Fig. 5. The various elements are shown mounted on a standard octal base. A crystal of semiconductive material 14 is mounted on plunger 19 which slidably fits into cylindrical member 20. Member 20 contains an internal coil spring (not shown) which forces the crystal 14 against the end of electrode spacer 23. Screw 21 and lock nut 22 serve to adjust the pressure exerted by the spring against the crystal. The whole assembly is attached to pin 24 of the octal base which serves to make electrical contact with the crystal. The spacer 23 is held by an encircling metallic strap 25 which is mounted on octal base pin 27 by means of bracket 26.

Figure 6:
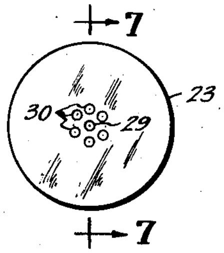
Fig. 6 is a sectional view of Fig. 5 showing the arrangement of electrodes and spacer.

The spacer 23 may be made of glass or other suitable insulating material such as quartz and contains a centrally located wire 29 and six wires 30 positioned uniformly around the central wire. The outer wires converge on the central wire until at the end of the spacer all wires are very closely spaced but nevertheless are electrically insulated from each other. The appearance of the end of the spacer 23 is shown in Fig. 6. Although the separation of the wires at the end of the spacer is so small as to be measured in microns the physical realization of such spacings is not difficult. The processes for producing spacers of this type are to be covered in a separate patent application. Briefly, however, one procedure is to start with a glass cylinder of convenient size having the required number of holes therethrough. This cylinder is then reduced in size by repeated fusing and drawing. As the size becomes small enough to be fragile a glass tube is closely fitted over the cylinder and the drawing continued. The process of drawing and increasing the wall thickness by adding glass tubes is continued until the holes have reached a diameter of three to five times that of the wires to be inserted. The wires are then inserted into the passageways and the drawing continued until the desired spacing is obtained. Another procedure is to start with a bundle of glass tubes of convenient size with a larger glass tube fitted over the outside of the bundle. This assembly is then fused and drawn down to the required size, adding additional tubes on the outside to build up the wall thickness as in the preceding case. The last drawing should be made adjacent to a cold section of the cylinder so as to result in a conical shape as shown in Fig. 5. This permits mutual divergence of the wires away from the crystal end of the spacer and reduces the interelectrode capacity. For extremely close spacings the spacer may be twisted during the last drawing until the wires make electrical contact. The spacer is then cut at this point and ground back in the direction of divergency until electrical separation of the wires is obtained, as indicated, for example, by an ohmmeter.

Figure 7:
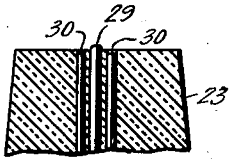
Fig. 7 is a sectional view of Fig. 6 showing further the arrangement of electrodes and spacer.

Fig. 7 shows a longitudinal cross-section of spacer 23. In grinding a flat surface in the end of the spacer the electrodes, if made of the harder metals, will protrude slightly above the surface of the glass as shown in the case of electrode 29. This extension serves to contact the crystal when the latter is pressed against the spacer. The electrodes 30, which are not supposed to touch the crystal, may be connected to a source of potential and etched back in an electrolyte. The amount of etching and hence the clearance between the control electrodes and the crystal may be accurately controlled by the voltage, time and concentration of the electrolyte.

Referring again to Fig. 5 the wires 30 are clamped under the metallic strip 25 so as to make an electrical connection between pin 27 and the control electrodes. Wire 29, which forms the output electrode, is attached to pin 31.

Figure 8:
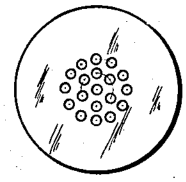
Fig. 8 shows an additional electrode arrangement.
Figure 9:
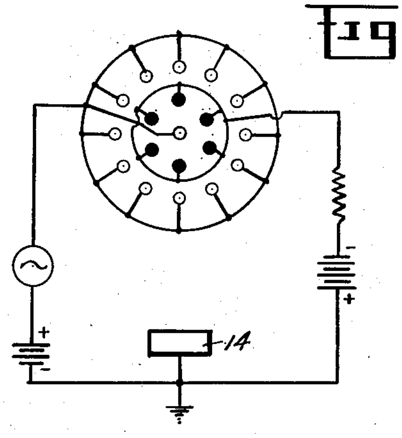
Fig. 9 shows a circuit employing the electrode arrangement of Fig. 8 to obtain parallel operation of several point contacts on a single crystal.

Several transconductors of the above described type may be operated in parallel on a single semiconductor crystal. One method of accomplishing this is to form a spacer having two rings of electrodes around a center electrode as shown in Fig. 8. The center electrode and outer ring of electrodes may act as control electrodes with the inner ring of electrodes acting as output electrodes. The circuit connections are as shown in Fig. 9 in which the dark points indicate electrodes that touch the semiconductor.

Figure 10:
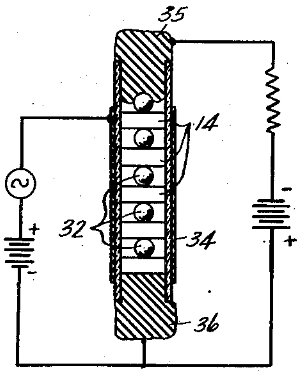
Fig. 10 shows apparatus for obtaining series operation of several point contacts.

Several transconductors may also be operated in series as shown in Fig. 10. In this arrangement a plurality of discs of semiconductive material 14 are separated by particles of metal 32 such as metal balls. The resulting pile of alternate discs and particles is contained in a glass tube 33, the inside diameter of which may be of the order of ½ millimeter. A metallic layer 34 is sputtered on the outer surface of the tube to act as a control electrode. The ends of the tube may be sealed by plugs 35 and 36 of plastic silver. The input circuit is connected between electrode 34 and plug 36 and the output circuit between plug 35 and plug 36.

In cases where the transconductor is to be used at high frequencies the interelectrode capacity between control electrodes and output electrode may become troublesome. In this case an arrangement such as shown in Fig. 8 may be used making the center electrode the output electrode, the outer ring of electrodes, the control electrode and using the intermediate ring of electrodes as a screen grid.

Figure 11:
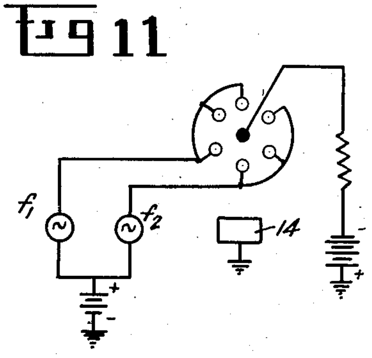
Fig. 11 shows an arrangement for using the transconductor as a frequency converter.

Fig. 11 illustrates the manner of using the transconductive device as a frequency converter. In the example shown an electrode structure such as shown in Fig. 6 is used with one of the frequencies being applied to half the control electrodes connected in parallel and the other frequency to the other half of the control electrodes connected in parallel. The center electrode touches the semiconductor and acts as the output electrode.

The manner in which the transconductor device may be used as a phase inverter can be seen from Fig. 2. The characteristics in this figure show that the device has mutual conductances of opposite sign for bias voltages on opposite sides of the zero mutual conductance point. Therefore, for example, in the case of the curve for $I_a$=75 microamperes, the phase of the output signal could be shifted through 180° by changing the bias voltage from −40 volts to +10 volts. The possibility of using the device for volume control by varying the biasing voltage will also be apparent from the curves.

Figure 12:
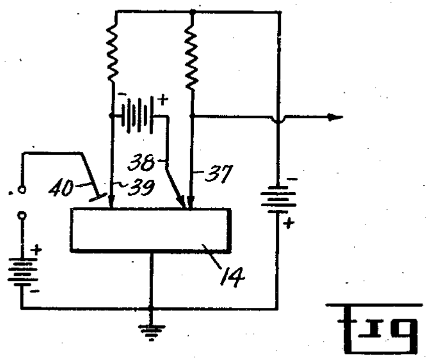
Fig. 12 shows the transconductive device used as an impedance changer.

The transconductive device can also be advantageously used in combination with a "transistor," described earlier in the specification, the device working as a preamplifier and at the same time as an impedance matching device between a high impedance signal source and the low input impedance of the "transistor." For this purpose both devices may be arranged on the same semiconductor as shown in Fig. 12 in which 37 and 38 represent the collector and emitter electrodes, respectively, of the "transistor" and 39 and 40 represent the output and input electrodes, respectively, of a transconductive device in accordance with the invention.

I claim:

1. A transconductive device comprising a thin walled tube of insulating material, a pile in said tube consisting of alternate metal particles and discs of semiconductive material, each metal particle being in electrical contact with each disc adjacent thereto whereby said particles and discs are in series conductive relationship, means for making electrical connections to the ends of said pile, and a control electrode consisting of a metallic layer on the outside of said tube and coextensive with said pile.

2. Apparatus as claimed in claim 1 in which an output circuit comprising a load impedance and a source of direct potential is connected between the ends of said pile and in which a source of signal and a biasing means is connected between said control electrode and one end of said pile.

OTMAR MICHAEL STUETZER.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 1,949,383 | Weber | Feb. 27, 1934 |
| 2,173,904 | Holst | Sept. 26, 1939 |
| 2,208,455 | Glaser | July 16, 1940 |
| 2,430,028 | Pfann | Nov. 4, 1947 |
| 2,524,033 | Bardeen | Oct. 3, 1950 |
| 2,524,035 | Bardeen et al. | Oct. 3, 1950 |
| 2,540,490 | Rittner | Feb. 6, 1951 |